United States Patent

[11] 3,599,278

| [72] | Inventor | Edward J. Crane |
| | | Ottumwa, Iowa |
| [21] | Appl. No. | 841,807 |
| [22] | Filed | July 15, 1969 |
| [45] | Patented | Aug. 17, 1971 |
| [73] | Assignee | International Agri-Systems, Inc. |
| | | Ottumwa, Iowa |

[54] METHOD FOR PICKING POULTRY
3 Claims, 9 Drawing Figs.

[52] U.S. Cl. ................................................ 17/47, 17/11.1
[51] Int. Cl. ............................................... A22c 21/02
[50] Field of Search ................................ 17/11.1, 47

[56] References Cited
UNITED STATES PATENTS

| 2,908,033 | 10/1959 | Zebarth | 17/47 |
| 3,218,668 | 11/1965 | Engkjer et al. | 17/47 |
| 3,471,893 | 10/1969 | Zebarth et al. | 17/11.1 |

*Primary Examiner*—Lucie H. Laudenslager
*Attorney*—Price, Heneveld, Huizenga & Cooper ABSTRACT: A method of picking poultry wherein birds suspended in flexible fashion from an overhead conveyor are conveyed through three different picking environments to completely defeather them. The initial picking stage includes a series of offset, counterrotating bullet-shaped supports having flexible fingers extending therefrom positioned on either side of the path. The two subsequent picking sections include (1) two overhead drum-type pickers having therebelow a pocket defined by upper and lower rows of bullet-shaped pickers which are offset with respect to one another; and (2) two horizontal drum-type pickers positioned to contact the wing and upper body portions of the bird having positioned thereabove a series of circular finger supports having fingers extending radially therefrom and rotatable about vertical axis to contact the legs of the birds. The latter two sections may be arranged in any order so long as they both follow the initial section described.

INVENTOR
EDWARD J. CRANE

ATTORNEYS

METHOD FOR PICKING POULTRY

This invention relates to a method of picking poultry and, more specifically, to such a method wherein poultry suspended in conventional fashion from an overhead conveyor mechanism are passed sequentially through a series of picking machines, each such machine preforming a particular picking function such that the birds, upon completing passage therethrough, will be completely wiped clean of feathers.

It has become customary in poultry-processing concerns to suspend the birds from an overhead conveyor by means of shackles or the like for conveyance through the various processing stations in the plant. The overhead conveyor, ordinarily, moves continuously and the birds are conveyed from processing station to processing station in uninterrupted fashion.

One of the initial operations which must be performed upon the birds during passage through the plant, of course, is the removal of the feathers therefrom. Numerous devices have been proposed for effecting this removal in such a fashion that it is not necessary to remove the birds from the conveyor mechanism. These devices have been utilized, ordinarily, in various combinations along the conveyor line in an attempt to effect, insofar as possible, complete removal of the feathers from the birds by mechanized means.

One of the problems which has plagued the poultry-processing industry for many years has been the unavailability of picking equipment which will remove all of the feathers from the birds and, yet, not subject them to frictional forces so harsh as to bruise or bark the carcasses. Any such bruising or barking, as will be readily appreciated by those skilled in the art, markedly degrades the quality of the processed product. Processors have been forced, thus, to compromise the desirability of complete feather removal with the undesirability of barking and bruising. Such a compromise has necessitated, unfortunately, the utilization of some human labor to complete removal of the feathers from the birds after their passage through the picking machines.

It is an object of this invention, therefore, to provide a method of picking poultry wherein the feathers will be removed completely from the birds by mechanized equipment and, yet, wherein barking or bruising of the carcasses is virtually eliminated.

It is an object of this invention, thus, to provide such a method wherein the necessity of providing human labor for completing the feather removal process is obviated.

It is an object of this invention, more particularly, to provide a method of picking poultry employing a unique sequence of wiping motions to the birds as they are conveyed along the processing line, such sequence being effective to achieve virtually complete feather removal without the necessity of touching up the birds by hand.

The objects of this invention are accomplished, briefly, by conveying the birds through a first picking section and therein periodically subjecting the birds to yielding engagement of movable flexible picking fingers affixed for rotation with individual supports to force at least portions of the birds first to one side of the path of travel thereof out of engagement with one of said supports and then to the other side of the path out of engagement with another of said supports. The birds are then conveyed through a subsequent picking section wherein they are subjected to a downwardly directed engagement of flexible picking fingers at the crotch and hock areas thereof while the neck, wing and upper body portions thereof are simultaneously subjected to yielding engatement of upper and lower banks of moving flexible picking fingers. The latter fingers are affixed for rotation to upper and lower banks of individual supports. These upper and lower banks of picking fingers force at least portions of the neck, wing and upper body sections of the birds first to one side of the path out of engagement with some of the supports and then to the other side of the path out of engagement with others of the supports to complete the picking operation.

The preferred embodiment of this invention will be readily understood by those skilled in the art by reference to the following specification and accompanying figures in which.

Figure 1A:
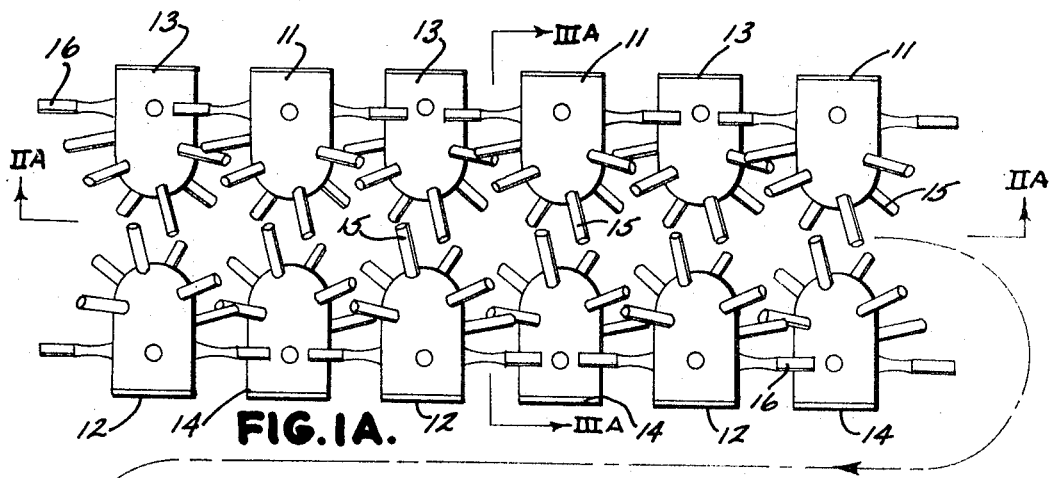
FIG. 1A is a schematic plan view of the initial picking section.
Figure 2A:
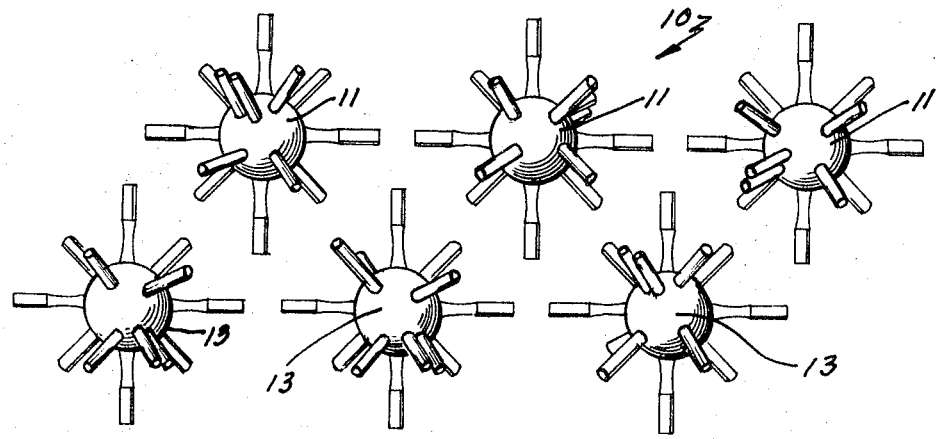
FIGS. 2A, 2B and 2C are schematic cross sections taken along the planes IIA, IIB and IIC of FIGS. 1A, 1B and 1C, respectively.
Figure 3A:
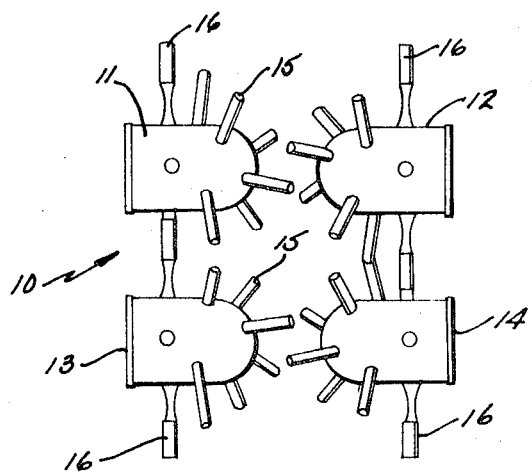
FIGS. 3A, 3B and 3C are schematic cross sections taken along planes IIIA, IIIB and IIIC of FIGS. 1A, 1B and 1C, respectively.

Referring now to the figures, a preferred embodiment of the invention will be described in detail. FIGS. 1A, 2A and 3A depict schematically a picking apparatus through which the birds are passed initially in the practice of this invention. This apparatus is disclosed in detail in copending application Ser. No. 631,989 filed Apr. 19, 1967 now abandoned but refiled in continuation form as application Ser. No. 19,075 on Mar. 12, 1970 assigned to the same assignee as the instant application. For a more detailed disclosure and discussion of the apparatus shown in these figures, reference should be had to this copending application which is specifically incorporated by reference herein.

The first picking apparatus or section 10, thus, comprises a row of upper bullet-shaped supports 11 on one side of the apparatus; identical offset supports 12 on the opposite upper side of the apparatus; a row of lower supports 13 on the one side of the apparatus and lower supports 14 on the opposite side of the apparatus. The bullet-shaped supports 11 through 14 each have positioned thereon a series of flexible picking fingers as described in detail in the noted copending application. Fingers 15 protrude from the nose or dome-shaped section of the supports while fingers 16 are positioned radially near the sidewalls of the apparatus for rotation in a plane generally perpendicular to the axis of rotation of the particular support to which they are affixed.

The positioning of the supports 11, 12, 13 and 14 in the apparatus 10 is such that the area laterally across the path of poultry travel from each such support is substantially free and, thus, a bird or portions thereof may swing to fill this area after is has been struck by the wiper fingers on any particular support. Thus, as viewed in the figures, the supports 11 and 12 are laterally staggered through the interior of the machine such that a bird passing therethrough is contacted initially by the fingers on one of the supports 12 (assuming the bird to be passing from left to right in FIG. 1A), then by the fingers on one of the supports 11, again by the fingers on one of the supports 12, etc.

The lower support assemblies 13 and 14, similarly, are positioned such that the bird, moving from left to right as viewed in FIG. 1A, contacts initially the fingers on one of the supports 13, then the fingers on the support 14, again the fingers on the supports 13, etc.

The upper and lower supports are offset, additionally, from one another such that in each longitudinally aligned pair, one of the supports is journaled on the opposite side of the machine from the other of the supports and one support assumes an upper position and the other a lower position. Thus, supports 12 are positioned on opposite sides of the machine from supports 13 and vertically spaced therefrom and supports 11 are positioned on opposite sides of the machine from the supports 14 and vertically spaced therefrom.

Stated in a different manner, with continuing reference to the apparatus shown in FIGS. 1A, 2A and 3A, the supports 11 and 12 on either side of the machine are positioned in zigzag fashion along the length of the path and, similarly, the supports 13 and 14 on either side of the path are positioned in zigzag fashion along the length of the path. Further, the upper and lower zigzag arrangements are opposite whereby the space on opposite sides of the path from each support is substantially empty.

The supports 11, 12, 13 and 14 as noted in detail in the copending application referred to previously, are rotated about horizontal axis in such directions that (1) adjacent supports in the same row (the rows designated by the reference numerals 11, 12, 13 and 14) rotate in opposite directions; (2) the pairs of longitudinally aligned supports (e.g. pair 13 and 11, pair 11 and 14) rotate in identical directions; (3) each group of four supports moving, for example, from left to right in FIG. 1A rotates in the same direction which is opposite from the direction of rotation of the next succeeding series of four supports designated by similar reference numerals.

The picking apparatus illustrated in FIGS. 1A, 2A and 3A functions as the "rougher" in the method which is the subject of this invention. That is to say, that after scalding the birds are passed through this apparatus for initial feather removal and most of the feathers are removed in this particular section of the processing line. When the bird comes into contact with the forward fingers 15 on one of the supports, portions of it will tend to be thrown toward the opposite wall of the apparatus out of engagement with the fingers. As this portion of the bird approaches the opposite wall, however, it will be struck by the elongated rear fingers 26 causing it to tumble back towards the central path portion through the apparatus. This process is repeated, as shown in detail in the copending application noted above, between the various supports during the entire passage of the entire bird through the apparatus.

When the bird comes into contact with two longitudinally aligned but vertically offset supports such as supports 12 and 13, the lower head section of the bird is thrown across the machine by contact with the fingers on supports 13 and the upper leg and body sections of the bird is thrown toward the opposite side of the machine by contact with fingers on support 12. This twisting is relatively unrestricted because of the lateral freedom of space opposite from the forward path abutting ends of each of the finger supports and the bird is free to tumble until such time as it is contacted by another picking finger directed so as to force it back toward the center of the path.

Figure 1B:
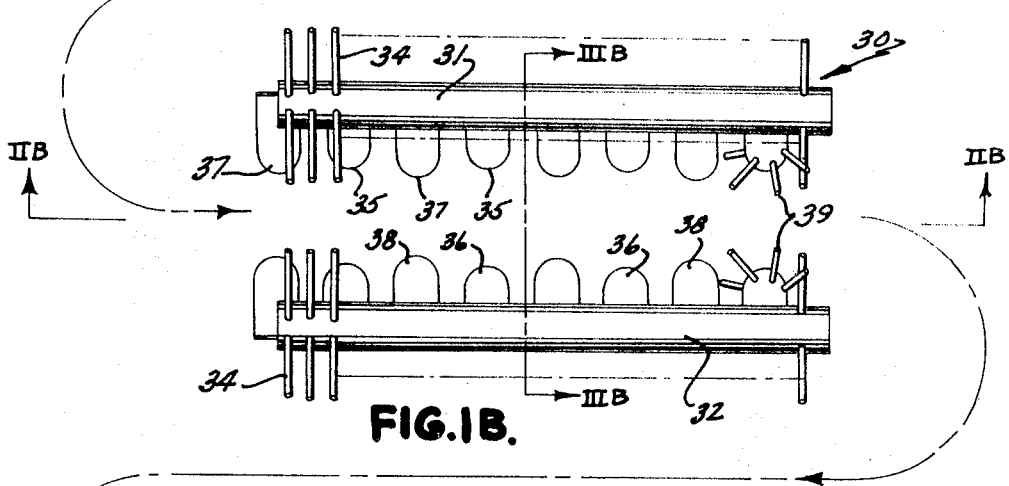
FIG. 1B is a schematic plan view of a subsequent picking section.
Figure 2B:
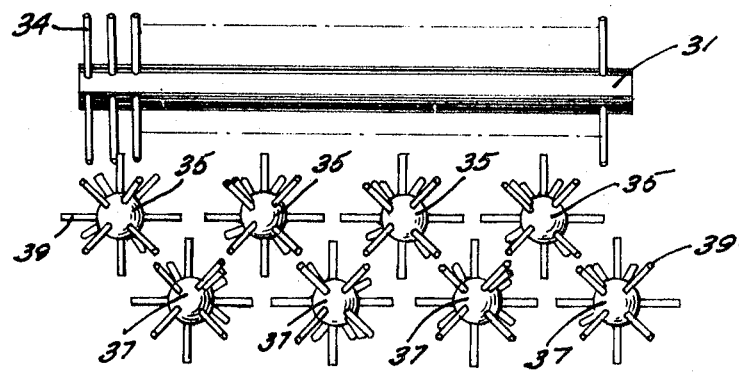
Figure 3B:
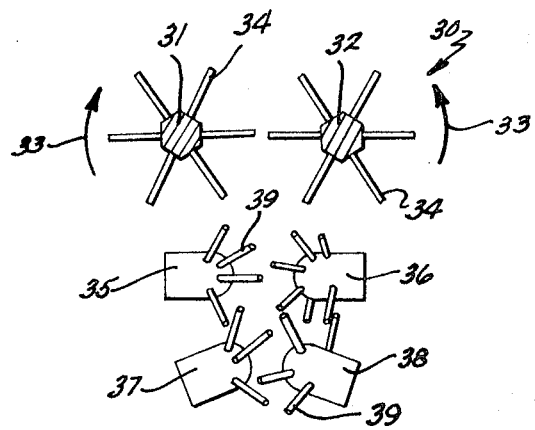

Referring now to FIGS. 1B, 2B and 3B, the second picking apparatus or section 30 through which the birds are passed in accordance with the teachings of this invention comprises a pair of opposed overhead drums 31 and 32 having fingers 34 extending radially therefrom. Drums 31 and 32 rotate in the direction indicated by the arrows 33 in FIG. 3B such that they tend to pull and hold the bird downwardly in the apparatus.

Positioned below the drums 31 and 32 in section 30 are a series of rows of rotatable picking supports. Supports 35 and 36, thus, rotate about generally horizontal axes directed toward the center portion of the path of bird travel, are positioned on opposite sides of the apparatus from one another and are offset in a manner similar to that discussed in connection with the apparatus 10. Two lower rows of supports 37 and 38, similarly, are positioned on opposite sides of the path of bird travel for rotation about axis inclined upwardly. Supports 37 and 38 are also offset with respect to one another and with respect, additionally, to the supports of the upper row in a manner identical to that described in connection with the apparatus 10. The space laterally across from each of the supports 35, 36, 37 and 38, thus, is relatively empty to permit the bird or portions thereof to be tumbled or thrown thereinto after contact by the flexible fingers 39 on the supports.

The apparatus shown in FIGS. 1B, 2B and 3B is disclosed specifically in copending application Ser. No. 735,251 filed Aug. 16, 1968 and assigned to the same assignee as the instant invention. This copending application is incorporated by reference specifically herein to the extent necessary to a thorough understanding of the apparatus 30. While the apparatus shown in the copending application referred to is not identical to that disclosed in this application, the rows 35, 36, 37 and 38 of supports are identical for all practical purposes as will be readily appreciated by those skilled in the art.

As the birds pass through the apparatus 30, it is contained within the pocket defined by the lower supports 35, 36, 37 and 38 by the downwardly exerted force of the drums 31 and 32. The fingers 39 extending into the pocket contact the upper portions of the bird while the fingers 34 of the drums 31 and 32 concentrate primarily on the legs and crotch portion.

Figure 1C:
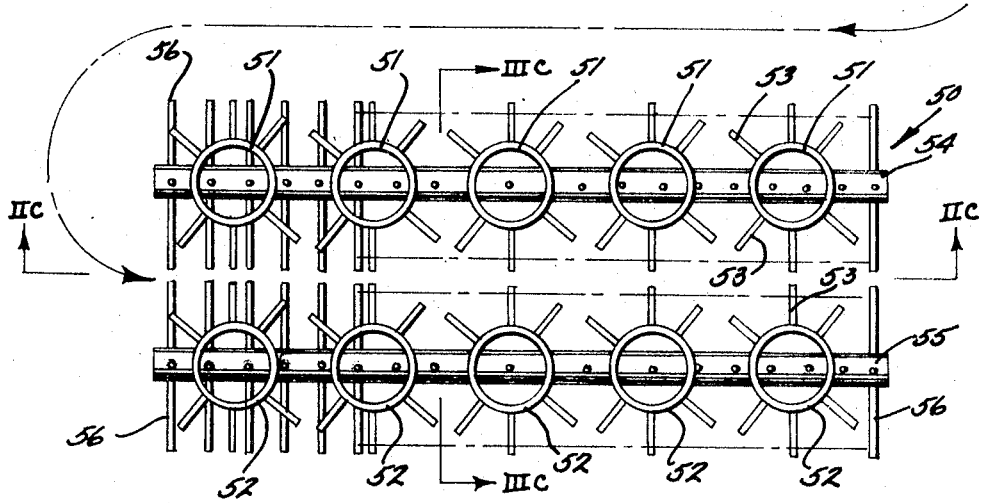
FIG. 1C is a schematic plan view of another subsequent picking section.
Figure 2C:
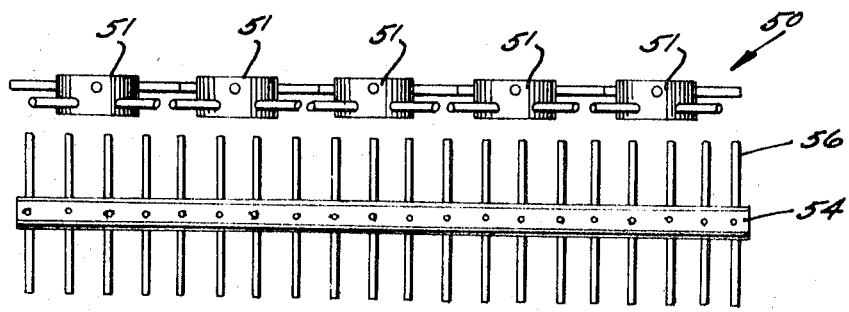
Figure 3C:
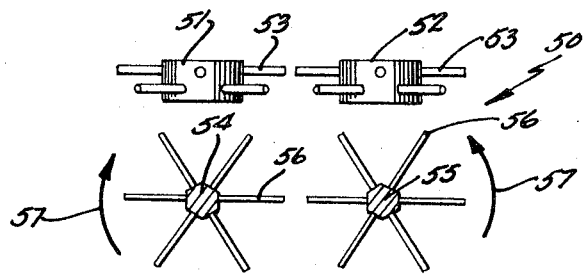

Referring now to FIGS. 1C, 2C and 3C, the third picking unit 50 which is utilized in the preferred embodiment of this invention includes two aligned rows of picking supports 51 and 52 positioned at the upper portion of either side of the path. Supports 51, thus, are positioned to one side of the path while supports 52 are positioned to the opposite side of the path. The supports 51 and 52 are rotated, as will be readily appreciated by those skilled in the art, about vertical axes and the fingers 53 extending vertically therefrom extend into the path. The fingers 53 contact the hock areas of the birds with a wiping motion which is generally parallel to the path of travel of the bird through the apparatus. The direction of rotation of the supports 51 and 52, preferably, is such that adjacent ones of the supports rotate in opposite directions. It is preferred, additionally, that supports positioned on opposite sides of the path from one another also rotate in opposite directions.

The picker illustrated schematically in FIGS. 1C, 2C and 3C has been commercially available for a number of years. It is marketed under the trade name Flexamatic by the assignee of this invention.

Positioned below the overhead supports 51 and 52 are two elongated picking drums 54 and 55 having flexible fingers 56 extending therefrom. Drums 54 and 55 rotate in the direction indicated by the arrow 57 in FIG. 3C such that they tend to hold the bird down in the machine such that the vertically staggered picking fingers 53 on the overhead supports 51 and 52 can effectively wipe the feathers from the hock or garter areas of the bird. The fingers 56, in addition to holding the bird down in the picking section 50, remove any feathers which may remain on the wings, neck and other upper body portions of the bird.

The picking sections 30 and 50 can both be properly typified, to some extent, as finishing machines. The relative positions of these particular sections with respect to the upper section 10 on the processing line is not critical to the concepts of this invention. Depending upon the particular types of birds being picked, it may be desirable in many situations, thus, to reverse the order of picking sections 30 and 50 from that shown in the drawings such that the birds pass initially through picking section 10 and then through sections 50 and 30 in that order.

It may be possible in some particular picking situations to eliminate unit 50 completely ans still achieve satisfactory results. It may be possible, additionally, to substitute other types of finishing pickers for the unit 50 either between the units 10 and 30 or behind them. Best results have been obtained, however, through use of the three units described.

By utilizing the method which has been herein disclosed, poultry may be picked mechanically with the assurance that virtually all of the feathers will be removed therefrom. Such feather removal is accomplished, additionally, without barking, bruising or otherwise mutilating the poultry carcasses, thus assuring a high quality product.

The embodiments of the invention in which I claim an exclusive property or privilege are defined as follows:

1. A method of picking poultry suspended flexibly in head-down fashion from an overhead conveyor and moved thereby along a predetermined path having the steps of:

conveying the birds first through a first picking section and therein periodically yieldable engaging the birds with moving flexible picking fingers affixed for rotation with individual supports forcing at least portion of said birds first to one side of said path out of yielding engagement with the fingers on one of said supports and then to the other side of said path out of yielding engagement with the fingers on another of said supports;

conveying the birds through a second picking section and therein downwardly engaging the wing, neck and upper body portions thereof with downwardly moving flexible picking fingers at either side of said path wiping feathers from the wing, neck and upper body portions of the birds and holding them down in said second section while simultaneously wiping the hock areas of the birds with flexible picking fingers moving generally parallel to the path of bird travel through said second picking section; and conveying said birds through a third picking section and therein downwardly engaging the crotch and hock areas thereof with moving, downwardly directed flexible picking fingers while simultaneously yieldably engaging the neck, wing and upper body portions of the bird with upper and lower banks of moving flexible picking fingers affixed for rotation with individual supports forcing at least portions of the neck, wing and upper body sections of said birds first to one side of said path out of yielding engagement with the fingers on some of the supports of said third section and then to the other side of said path out of yielding engagement with the fingers on others of the supports of said third section.

2. A method of picking poultry suspended flexibly in head-down fashion from an overhead conveyor and moved thereby along a predetermined path having the steps of:

conveying the birds first through a first picking section and head-down periodically yieldably engaging the birds with moving flexible picking fingers affixed for rotation with individual supports forcing at least portions of said birds first to one side of said path out of yielding engagement with the fingers on one of said supports and then to the other side of said path out of yielding engagement with the fingers on another of said supports; and conveying said birds through a second picking section and therein downwardly engaging the crotch and hock areas thereof with moving, downwardly directed flexible picking fingers while simultaneously yieldably engaging the neck, wing and upper body portions of the bird with upper and lower banks of moving flexible picking fingers affixed for rotation with individual supports forcing at least portions of the neck, wing and upper body sections of said birds first to one side of said path out of yielding engagement with the fingers on some of the supports of said second section and then to the other side of said path out of yielding engagement with the fingers on others of the supports of said second section.

3. The method of claim 2 which further comprises the step of conveying the birds through a third picking section and therein downwardly engaging the wing, neck and upper body portions thereof with downwardly moving flexible picking fingers at either side of said path wiping the feathers from the wing, neck and upper body portions of the birds and holding them down in said third section while simultaneously wiping the hock areas of the birds with flexible picking fingers moving generally parallel to the path of bird travel through said third picking section.

PO-1050
(5/69)

UNITED STATES PATENT OFFICE
CERTIFICATE OF CORRECTION

Patent No. 3,599,278      Dated August 17, 1971

Inventor(s) Edward J. Crane

It is certified that error appears in the above-identified patent and that said Letters Patent are hereby corrected as shown below:

Column 3, line 25;

"rear fingers 26" should be --- rear fingers 16 ---;

Column 3, line 67;

"Ser. No. 735,251" should be --- Ser. No. 753,251 ---;

Column 4, line 51;

"completely ans still achieve" should be --- completely and still achieve ---;

Column 5, line 28;

"head-down" should be --- therein ---.

Signed and sealed this 21st day of March 1972.

(SEAL)
Attest:

EDWARD M. FLETCHER, JR.
Attesting Officer

ROBERT GOTTSCHALK
Commissioner of Patents